(12) United States Patent
Wang et al.

(10) Patent No.: US 8,912,755 B2
(45) Date of Patent: Dec. 16, 2014

(54) CHARGING DEVICE USED IN HANDHELD DEVICES

(75) Inventors: Ko-Ming Wang, Taichung (TW); Chung-Yi Huang, Taichung (TW)

(73) Assignee: Merry Electronics Co., Ltd., Taichung (TW)

( * ) Notice: Subject to any disclaimer, the term of this patent is extended or adjusted under 35 U.S.C. 154(b) by 325 days.

(21) Appl. No.: 13/356,148

(22) Filed: Jan. 23, 2012

(65) Prior Publication Data

US 2013/0187607 A1   Jul. 25, 2013

(51) Int. Cl.
*H02J 7/02* (2006.01)
*H02J 7/00* (2006.01)

(52) U.S. Cl.
USPC ............................ 320/111; 320/103; 320/115

(58) Field of Classification Search
USPC .......................................... 320/110–115, 103
See application file for complete search history.

(56) References Cited

U.S. PATENT DOCUMENTS

| | | | | |
|---|---|---|---|---|
| 6,049,192 A | * | 4/2000 | Kfoury et al. | 320/113 |
| 7,579,810 B2 | * | 8/2009 | Hsieh | 320/110 |
| 2007/0236180 A1 | * | 10/2007 | Rodgers | 320/115 |
| 2009/0108802 A1 | * | 4/2009 | Wu | 320/103 |

\* cited by examiner

*Primary Examiner* — Samuel Berhanu
(74) *Attorney, Agent, or Firm* — Muncy, Geissler, Olds & Lowe, P.C.

(57) ABSTRACT

A charging device used in a handheld device comprises a main body, a coupling portion connected to an end of the main body and the coupling portion has a connector, and a battery unit connected to another end of the main body. When the charging device is in a first status, the battery unit and the connector are coupled together; when it is in a second status, the battery unit is detached from the connector so that the connector is electrically connected with the handheld device in order to have the handheld device charged.

16 Claims, 8 Drawing Sheets

CHARGING DEVICE USED IN HANDHELD DEVICES

BACKGROUND OF THE INVENTION

1. Field of Invention

The present invention relates to a charging device and more particularly to a charging device used in a handheld device for charging the handheld device and it is provided with an operation that is easy to use.

2. Related Art

Handheld electronic product is one of the most popular products in the markets today, and it provides the functions of communication, entertainment, navigation and connection to the internet to meet the requirements of consumers. Nevertheless, the biggest problem of an electronic product is the operational hours of its battery; therefore, mobile power source is introduced into the markets for supplying handheld electronic products with an auxiliary power supply.

Referring to FIG. 1, which is an illustration of a conventional mobile phone being charged. A power supply device 2 is electrically connected to a bottom end of a mobile phone 1 for charging the mobile phone 1. However, the overall length is too long with such a connection method; therefore, it is inconvenient to talk on the phone under a charging status.

Referring to FIG. 2, which is an illustration of another conventional mobile phone being charged. A back-couple type power supply device 4 is coupled to a mobile phone 3, so that the power supply device 4 is disposed on a back of the mobile phone 3 for charging and protecting the mobile phone 3. Nevertheless, such a structure is only suitable for certain products; therefore, its applicability is limited.

Furthermore, when the two types of power supply devices 2 and 4 mentioned above are not under usage, their metal connecting portions are exposed which can be damaged or can get dirty easily.

SUMMARY OF THE INVENTION

In order to tackle the abovementioned existing problems, the present invention provides a charging device used in a handheld device, and it is easy to use under a handheld status and it can be placed uprightly on a table.

In order to achieve the abovementioned objects, the present invention discloses a charging device used in a handheld device, it comprises a main body, a coupling portion connected to an end of the main body and the coupling portion has a connector, and a battery unit connected to another end of the main body. When the charging device is in a first status, the battery unit and the connector are coupled together; when it is in a second status, the battery unit is detached from the connector so that the connector is electrically connected with the handheld device in order to have the handheld device charged. Accordingly, in the first status, the battery unit and the coupling portion are coupled together so as to cover and protect the connector from getting damaged and dirty; in the second status, the battery unit can be overturned to be disposed on a back of the main body so that the handheld device can be electrically connected to the connector for charging, and the battery unit and the coupling portion can be placed on a table so that the present invention can be placed uprightly on the table. Therefore, the handheld device can be placed on the table in different ways.

DETAILED DESCRIPTION OF THE INVENTION

A charging device used in a handheld device of the present invention will become more fully understood by reference to the following embodiments and detailed description thereof when read in conjunction with the attached drawings.

Figure 1:
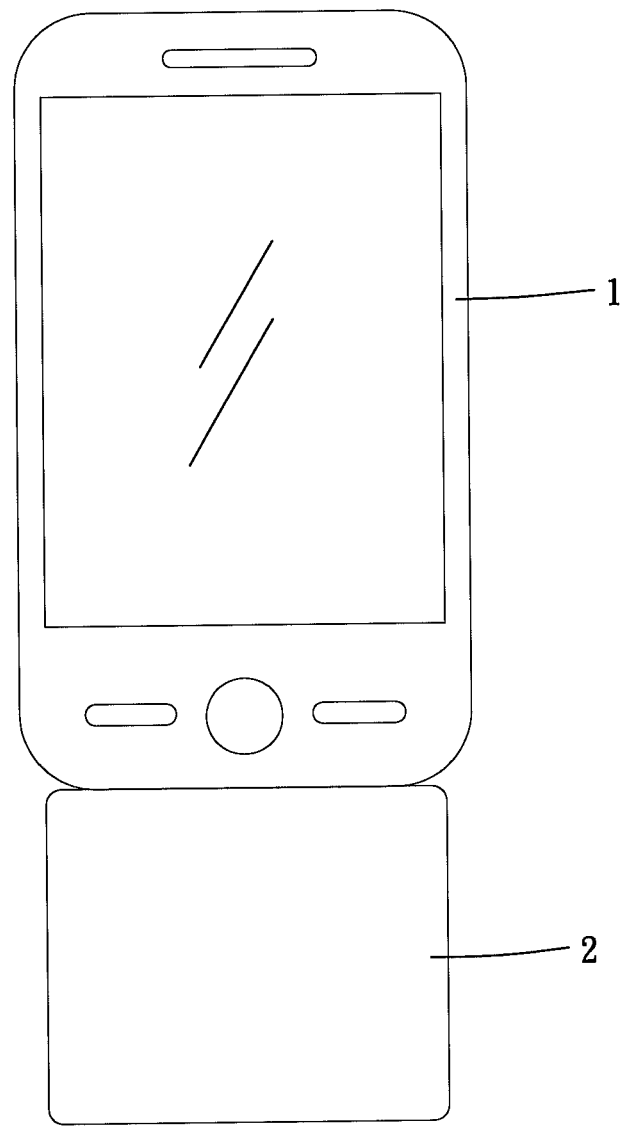
FIG. 1 is an illustration of a conventional mobile phone being charged.
Figure 2:
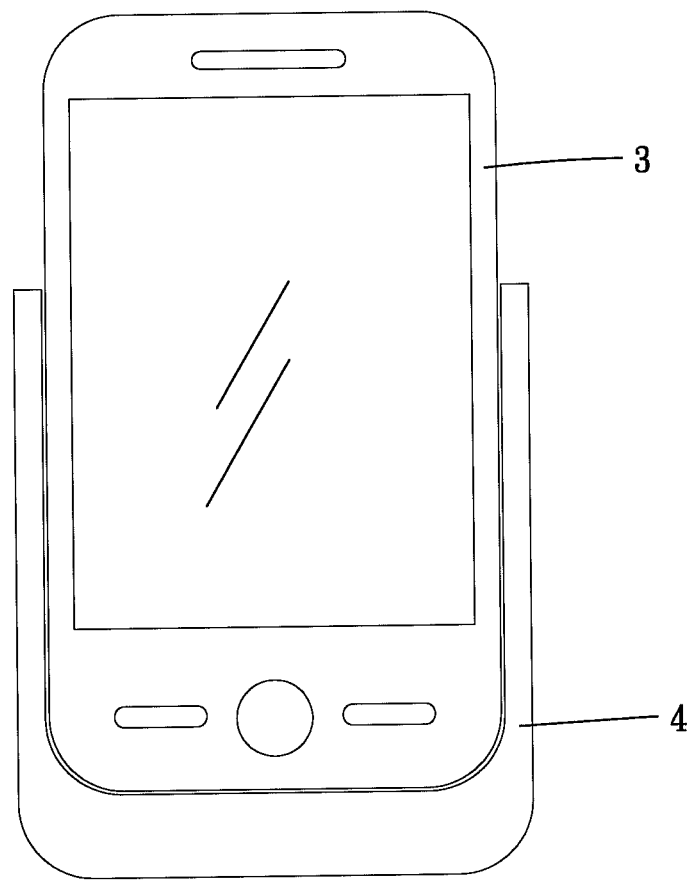
FIG. 2 is an illustration of another conventional mobile phone being charged.
Figure 3:
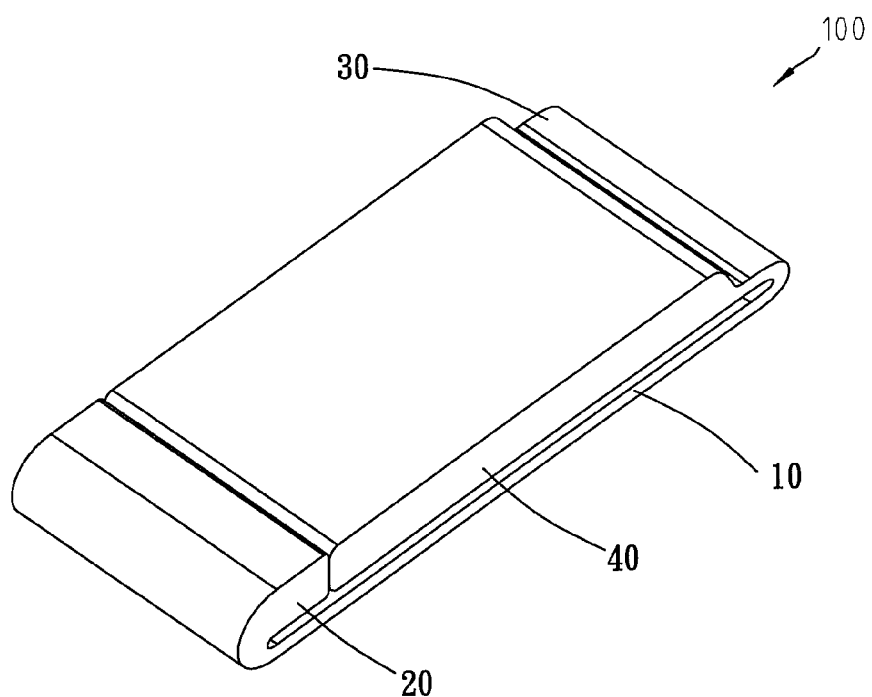
FIG. 3 is a perspective view of a charging device used in a handheld device of the present invention.
Figure 4:
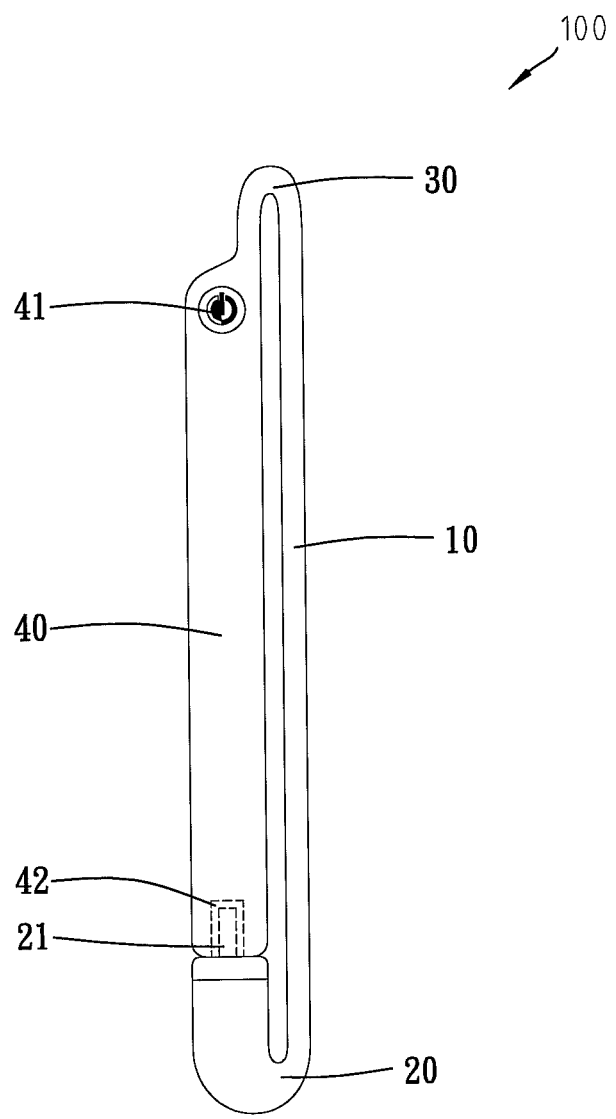
FIG. 4 is a side view of the charging device used in a handheld device of the present invention.

Referring to FIGS. 3 and 4, which are a perspective view and a side view of a charging device used in a handheld device of the present invention respectively. A charging device 100 of the present invention for using in a handheld device comprises a main body 10, a coupling portion 20 is disposed at one end of the main body 10, and a bent portion 30 is disposed at another end of the main body 10 for connecting with a battery unit 40. When the charging device 100 is in a first status, the battery unit 40 is coupled with the coupling portion 20 and it is in an engaging position.

The main body 10 is a thin plate with certain rigidity.

The coupling portion 20 has a certain degree of flexibility and its rigidity is lower than that of the main body 10. A connector 21 is disposed on the coupling portion 20 and it can be a universal serial bus such as USB, mini USB, micro USB, etc. A type of the connector 21 is depended on a corresponding handheld device.

The bent portion 30 has a certain degree of flexibility and it is disposed between the battery unit 40 and the main body 10. The rigidity of the bent portion 30 is lower than that of the battery unit 40 and the main body 10 so that the battery unit 40 can be overturned relative to the main body 10.

A power switch 41 is disposed on a side of the battery unit 40 and a coupling groove 42 is disposed at its bottom, such that the battery unit 40 can be coupled with the coupling portion 20 by coupling the coupling groove 42 to the connector 21, and the battery unit 40 is engaged on a front side of the main body 10.

Figure 5:
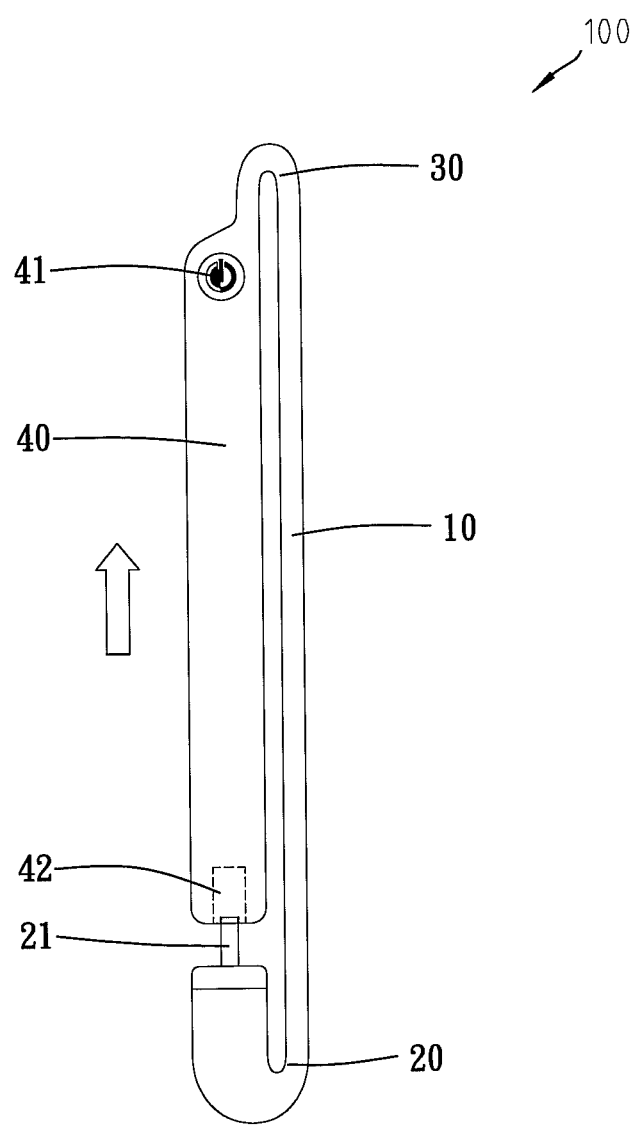
FIG. 5 is a side view of the charging device used in a handheld device with a battery unit being detached from a coupling portion of the present invention.
Figure 6:
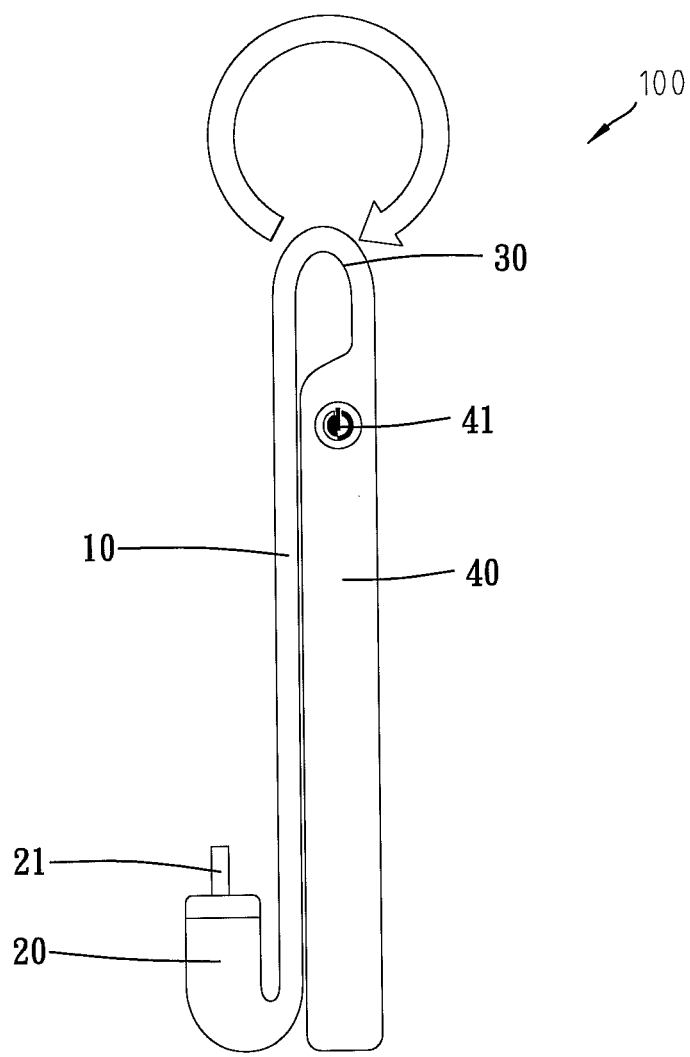
FIG. 6 is a side view of the charging device used in a handheld device with the battery unit overturned and disposed on a back side of a main body of the present invention.

Referring to FIGS. 5 and 6, the battery unit 40 is detached from the coupling portion 20. By using the flexibility of the bent portion 30, the battery unit 40 may depart gradually from the coupling portion 20, and the battery unit 40 can be overturned towards a back side of the main body 10 so that it is disposed on the back side of the main body 10.

Figure 7:
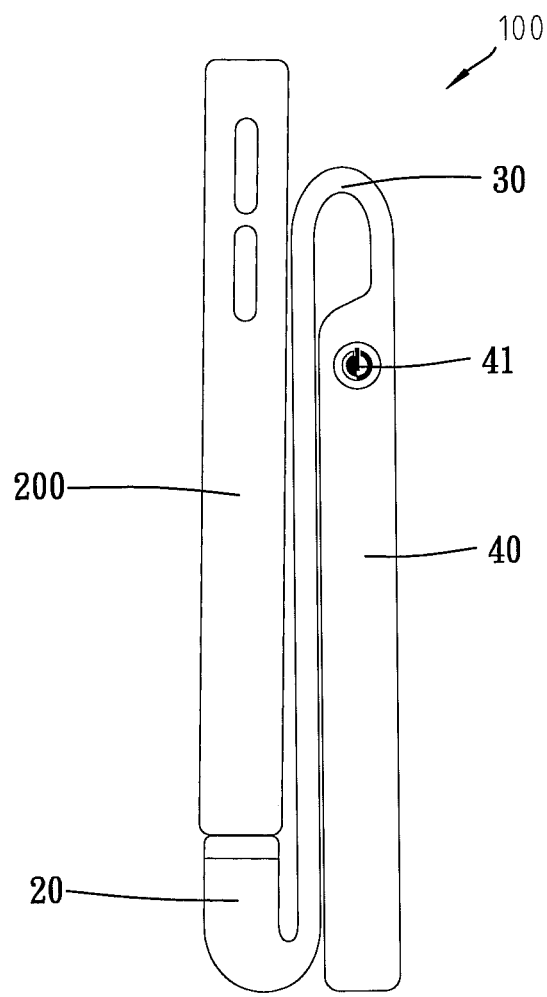
FIG. 7 is a side view of the charging device used in a handheld device of the present invention being used for charging.

Referring to FIG. 7, when the charging device 100 is in a second status, the battery unit 40 is detached from the connector 21 by using the abovementioned steps, so that a mobile phone 200 can be charged by electrically connecting to the connector 21. The mobile phone 200 is only a type of handheld device disclosed in the present invention, but is not limited thereto.

When the battery unit 40 is disposed on the back side of the main body 10, the front side of the main body 10 can be available for placing the mobile phone 200, and a socket at a bottom end of the mobile phone 200 can be coupled with the connector 21 for electrical connection, so that the mobile phone 200 can be charged by the battery unit 40. When the mobile phone 200 is being charged, the battery unit 40 can be overturned to be disposed on the back side of the main body 10; therefore, not much extra space is occupied by the overall length, and the operation of the mobile phone 200 is not affected during usage.

Figure 8:
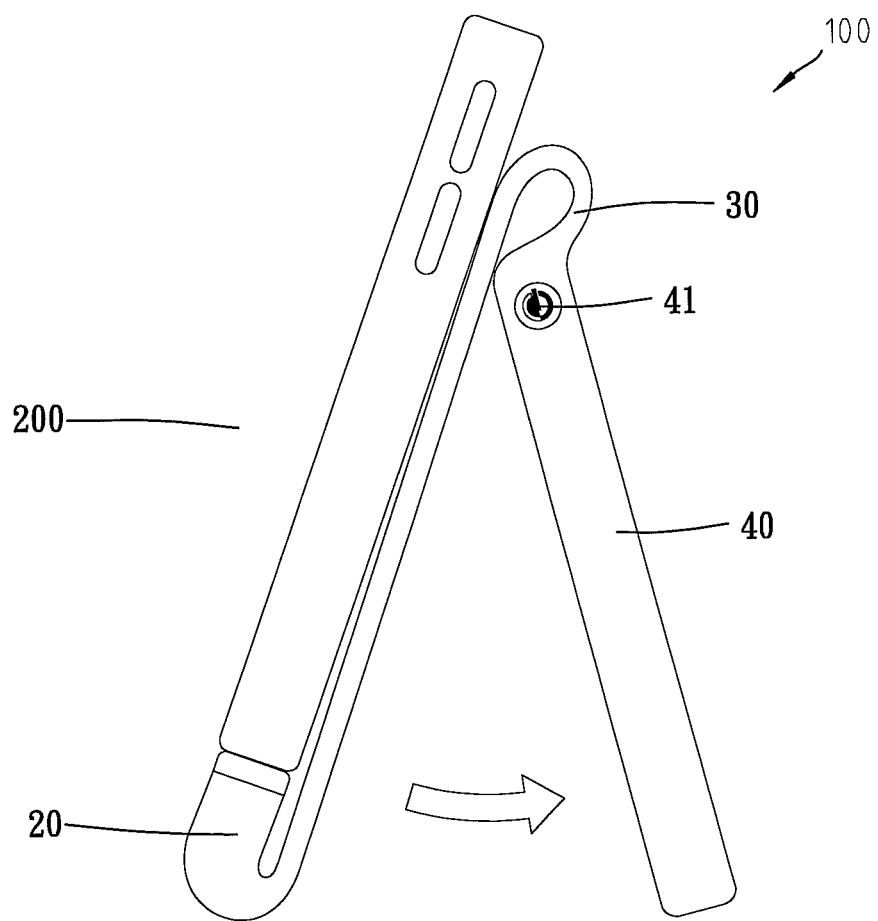
FIG. 8 is a side view of the charging device used in a handheld device of the present invention being placed uprightly.

Referring to FIG. 8, because the bent portion 30 is flexible, the battery unit 40 can be spread out to a predetermine angle relative to the main body 10, so that the battery unit 40 can be used a supporting structure and two supporting points are formed with the coupling portion 20. Therefore, the charging device 100 can be placed uprightly on the table and the mobile phone 200 can be displayed or placed uprightly on the table.

According to the charging device used in a handheld device of the present invention, the first status is a non-charging status, the battery unit is engaged by having the coupling groove coupled with the connector of the coupling portion for convenient storage, and the connector can be covered and protected from getting damaged and dirty. The second status is a charging status, the battery unit can be overturned to be disposed on the back side of the main body, and the mobile phone is placed on the front side of the main body to be electrically connected with the connector of the coupling portion, so that a better holding effect is provided. Because of the flexible bent portion connected between the battery unit and the main body, the battery unit can be overturned easily relative to the main body. The battery unit can be used as a supporting structure and two supporting points for placing on the table are formed with the coupling portion. Therefore, the charging device can be placed uprightly on the table and the handheld device can be displayed or placed uprightly on the table.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A charging device used in a handheld device: comprising:
    a main body;
    a coupling portion connected to a first end of the main body and the coupling portion having a connector; and
    a battery unit connected to a second end of the main body, wherein when the charging device is in a non charging status, the battery unit and the connector are coupled together; when the charging device is in a charging status, the battery unit is detached from the connector so that the connector is electrically connected with the handheld device in order to have the handheld device charged.

2. The charging device used in the handheld device as claimed in claim 1, wherein a bent portion is disposed between the main body and the battery unit.

3. The charging device used in the handheld device as claimed in claim 2, wherein the bent portion is flexible.

4. The charging device used in the handheld device as claimed in claim 3, wherein a rigidity of the bent portion is lower than rigidity of the main body and the battery unit.

5. The charging device used in the handheld device as claimed in claim 1, wherein the battery unit has a coupling groove for coupling with the connector in the non charging status.

6. The charging device used in the handheld device as claimed in claim 1, wherein the coupling portion is flexible.

7. The charging device used in the handheld device as claimed in claim 1, wherein the connector is a universal serial bus.

8. The charging device used in the handheld device as claimed in claim 1, wherein the battery unit can be overturned relative to the main body in order to be used as a supporting structure.

9. A charging device used in a handheld device comprising:
    a main body having a first end and a second end;
    a battery unit; and
    a flexible bent portion connected to the first end of the main body and the battery unit,
    wherein when the charging device is in a first status, the battery unit and a connector of a coupling portion at the second end of the main body are coupled together; when the charging device is in a second status, the battery unit is detached from the connector so that the connector is electrically connected with the handheld device for charging the handheld device.

10. The charging device used in the handheld device as claimed in claim 9, wherein the first status is a non charging status, and the second status is a charging status.

11. The charging device used in the handheld device as claimed in claim 9, wherein a rigidity of the bent portion is lower than rigidity of the main body and the battery unit.

12. The charging device used in the handheld device as claimed in claim 9, wherein the battery unit has a coupling groove for coupling with the connector in the first status.

13. The charging device used in the handheld device as claimed in claim 9, wherein the coupling portion is flexible.

14. The charging device used in the handheld device as claimed in claim 9, wherein the connector is a universal serial bus.

15. The charging device used in the handheld device as claimed in claim 9, wherein the battery unit can be overturned relative to the main body in order to be used as a supporting structure.

16. A charging device used in a handheld device comprising:
    a main body having a first end and a second end;
    a battery unit; and
    a flexible bent portion connected to the first end of the main body and the battery unit,
    wherein when the charging device is in a non charging status, the battery unit and a connector of a coupling portion at the second end of the main body are coupled together; when the charging device is in a charging status, the battery unit is detached from the connector so that the connector is electrically connected with the handheld device for charging the handheld device.

* * * * *